United States Patent [19]
Ohta et al.

[11] Patent Number: 5,991,623
[45] Date of Patent: Nov. 23, 1999

[54] METHOD AND SYSTEM FOR PREVENTING UNJUST USE OF PERSONAL COMMUNICATION TERMINAL

[76] Inventors: Tadahiro Ohta; Koji Shirota, both of c/o Fujitsu Communication Systems Limited, 9-18, Shinyokohama 3-chome, Kohoku-ku, Yokohama-shi, Kanagawa 222, Japan

[21] Appl. No.: 08/773,915

[22] Filed: Dec. 27, 1996

Related U.S. Application Data

[63] Continuation of application No. 08/619,913, Mar. 20, 1996, abandoned.

[30] Foreign Application Priority Data

Sep. 19, 1995 [JP] Japan .................................. 7-239657

[51] Int. Cl.⁶ ..................................................... H04Q 7/24
[52] U.S. Cl. .............................. 455/435; 455/512; 380/21
[58] Field of Search ..................................... 455/435, 512; 380/21

[56] References Cited

U.S. PATENT DOCUMENTS

| | | | |
|---|---|---|---|
| 4,028,500 | 6/1977 | McClure et al. | 379/59 |
| 4,593,155 | 6/1986 | Hawkins | 379/62 |
| 4,794,636 | 12/1988 | Sanglier et al. | 379/62 |
| 4,972,479 | 11/1990 | Tobias, Jr. et al. | 380/33 |
| 5,070,521 | 12/1991 | Warner et al. | 379/58 |
| 5,150,412 | 9/1992 | Maru | 380/43 |
| 5,241,598 | 8/1993 | Raith | 380/21 |
| 5,249,304 | 9/1993 | Mulford | 455/512 |
| 5,337,344 | 8/1994 | Alvesalo | 379/58 |
| 5,349,632 | 9/1994 | Nagashima | 455/435 |
| 5,379,451 | 1/1995 | Nakagoshi et al. | 455/435 |

*Primary Examiner*—William Cumming

[57] ABSTRACT

In a communication system which is composed of portable personal communication terminals, a base station for transmitting and receiving a radio signal to and from each of the personal communication terminals and an exchange connected to the base station, each of the personal communication terminals is provided with a storage means for storing communication control information for controlling the communication state of the personal communication terminal, and the exchange is provided with a storage means for updating the communication control information of each of the personal communication terminals and storing the updated information. Each of the personal communication terminals transmits the communication control information together with identification data to the exchange through the base station at the time of communication, the exchange compares the communication control information received with the communication control information stored in correspondence with the personal communication terminal, and when they agree, the communication is permitted, while the communication is inhibited when they do not agree, thereby preventing the unjust use of the personal terminal.

24 Claims, 11 Drawing Sheets

METHOD AND SYSTEM FOR PREVENTING UNJUST USE OF PERSONAL COMMUNICATION TERMINAL

This is a continuation, of application Ser. No. 08/619,913, filed Mar, 20, 1996, now abandoned.

BACKGROUND OF THE INVENTION

Field of the Invention

The present invention relates to a method of preventing unjust use of a personal communication terminal and, more particularly, to a method of preventing unjust use of a personal communication terminal in a communication system which is composed of portable personal communication terminals, a base station for transmitting and receiving a radio signal to and from each of the personal communication terminals and an exchange which is connected to the base station.

A personal handy phone system is a new telephone service which enables a slave phone (personal communication terminal) of a cordless digital telephone to be carried out so as to use the personal communication terminal at a given place. FIG. 10 shows the structure of a personal handy phone system. In FIG. 10, the reference numeral $1_{11}, 1_{12}, \ldots, 1_2$ ... represent portable personal communication terminals, $2_1$ to $2_N$ base stations (BS) which are provided in public telephone boxes or the like so as to transmit and receive a signal to and from the personal communication terminals, and 3 an exchange which is connected to the base stations.

Each of the personal communication terminals $1_{11}, 1_{12}, \ldots, 1_2 \ldots$ constantly compares the positional information which is supplied from the corresponding base station $2_1$ to $2_N$ with the positional information which it holds, and if it is not the same, the corresponding personal communication terminal stores the newly received positional information and transmits the terminal ID to the exchange 3 through the base station so as to register the position. At the time of calling, if the user of the personal communication terminal $1_{11}$ inputs the telephone number of a called party, the base station $2_1$ designates the communication channel and connects the personal communication terminal $1_{11}$ with the exchange 3. Thereafter, the exchange 3 executes the call setting process between the exchange 3 and the personal communication terminal $1_{11}$ through the base station $2_1$, and connects the personal communication terminal $1_{11}$ with the terminal of the called party. At the time of reception of call, the exchange 3 obtains a base station in a zone to which the terminal of the called party belongs on the basis of the telephone number of the called party and the registered positional information which is stored by a position registering process, and informs the base station of the reception of the call. On the basis of the information about the reception of the call, the base station calls the terminal of the called party, designates the communication channel, and connects the exchange 3 with the personal communication terminal.

It is expected that such a personal handy phone system will come into wide use and various kinds of terminals will be developed in the future. It is then necessary to guard against the unjust use of a terminal. For this purpose, it is necessary to incorporate an unjust use checking mechanism, namely, an "identification mechanism" into a newly developed terminal.

In a conventional personal handy phone system, the exchange 3 is provided with a data base for "cryptographic keys" and ascertains whether or not the corresponding terminal is justly used by starting a identification process with respect to the terminal at the time of calling, reception and position registration.

FIG. 11 is an explanatory view of the identification process at the time of calling. As shown in FIG. 10, identification types $4a$ and cryptographic keys $4b$ are registered in the memory $3a$ of the exchange 3 in correspondence with the terminal IDs of the service subscribers. The terminal ID $5a$ and the cryptographic key $5b$ are registered in the ROM of each personal communication terminal.

(1) When the personal communication terminal $1_{11}$ calls by inputting the phone number of a called party, it transmits a SET UP message to the exchange 3 through the base station $2_1$. (2) The exchange 3 obtains the identification type $4a$ and the cryptographic key $4b$ corresponding to the calling terminal ID which are included in the SET UP message, and creates random numbers on the basis of the identification type $4a$ and the cryptographic key $4b$. (3) The exchange 3 transmits the random numbers to the personal communication terminal $1_{11}$. (4) When the personal communication terminal $1_{11}$ receives the random numbers, it enciphers the random numbers by using the cryptographic key $5b$ it holds, (5) and transmits the cryptogram to the exchange 3. (6) In parallel with this operation, the exchange 3 enciphers the random numbers by using the cryptographic key $4b$, and (7) compares the cryptogram obtained with the cryptogram received from the personal communication terminal $1_{11}$. (8) If the cryptograms are not coincident, the exchange 3 regards the call as a call from a noncontractor and rejects communication, (9) while if the cryptograms are coincident, the exchange 3 transmits call reception approval to the personal communication terminal $1_{11}$, and continues the calling processing so as to connect the personal communication terminal $1_{11}$ with the terminal of the called party.

By starting this identification process, it is possible to prevent the unjust use of the service by a noncontractor. However, if the contents of the ROM of a personal communication terminal of a real contractor are copied by a mala fide third party and the copied ROM is mounted on a personal communication terminal which is not contracted, it is possible to freely call from the unjust terminal. In this case, communication from the unjust terminal is freely possible and the owner of the personal communication terminal of the original ROM (real contractor) is naturally charged for the communication until the owner of the personal communication terminal perceives the existence of an unjust user of the terminal from the bill charging him too much for the actual calls and takes a measure such as a change in the cryptographic key.

Such a problem of unjust use is also encountered in a mobile communication system such as a car telephone system and a portable telephone system. To solve this problem, the following method of preventing the unjust use of a mobile communication system is proposed (U.S. Ser. No. 08/398,217, application date Mar. 2, 1995), the mobile communication system being composed of a mobile network which includes a mobile communication exchange office, a plurality of base control stations connected to the mobile communication exchange office and a plurality of base stations controlled by the corresponding base control stations, and a plurality of mobile stations each of which exists in a radio zone of the predetermined base station so as to transmit and receive control data for calling processing and a communication signal to and from the corresponding base station through a control channel and a communication channel, respectively.

The mobile network counts the number of calls from a mobile station in a predetermined time of period, stores the number in correspondence with the ID of the mobile station, and periodically reports the number of received calls to the respective mobile stations. Each of the mobile station counts and stores the number of calls which have been requested in a predetermined period of time, and when the number of received calls is reported from the mobile network, the mobile station compares the number of received calls with the stored number of calls which have been requested and reports the agreement/disagreement to the mobile network. If the mobile network receives the report of disagreement, it thereafter stops receiving a call from the corresponding mobile station. In this manner, it is possible to prevent the unjust use of a mobile terminal provided in the mobile station even if the contents of the ROM of the mobile terminal of a real contractor are copied by a mala fide third party. However, this method of preventing unjust use under the control of the mobile network has the following problems.

(1) Each of the mobile stations is required to have a function of identifying the number of received calls which is sent from the mobile network, a function of comparing the number of received calls with the number of calls which have been requested, and a function of reporting the agreement/disagreement to the mobile network. Therefore, each mobile station has a complicated structure and becomes expensive.

Personal communication is a communication system which attaches much importance to a small size, a light weight and a low cost of a personal communication terminal. It is therefore necessary to provide as little service function as possible for a personal communication terminal. However, the proposed method of preventing unjust use requires the above-described functions, which makes the structure complicated and raises the cost.

(2) In the proposed method of preventing the unjust use of a mobile terminal, when the mobile network finds an unjust mobile station having a predetermined ID, it thereafter stops receiving the request for call from the mobile station having the ID. According to this method, a procedure for restoring the calling function to the real mobile station is complicated and calling is impossible for a long time during the procedure.

(3) In the proposed method of preventing the unjust use of a mobile terminal, since the mobile network periodically reports the number of received calls, the number of received calls is also open to an unjust mobile terminal. There is therefore a risk of the unjust use of the open information.

(4) Since the mobile network must periodically report the number of received calls to each of a multiplicity of mobile stations and execute predetermined processing when the agreement/disagreement is reported, the load of the mobile network increases.

SUMMARY OF THE INVENTION

Accordingly, it is a first object of the present invention to eliminate the above-described problems in the related art and to provide a method of preventing the unjust use of a personal communication terminal which is capable of effectively preventing the unjust use of a personal communication terminal under the control of the personal communication terminal.

It is a second object of the present invention to provide a method of preventing unjust use of a personal communication terminal which is capable of preventing the use of an unjust terminal even if the contents of the ROM of a personal communication terminal of a real contractor are copied by a mala fide third party and the copied ROM is mounted on the unjust terminal.

It is a third object of the present invention to provide a method of preventing unjust use of a personal communication terminal which makes it easy for the personal communication terminal to recognize the presence of an unjust terminal.

It is a fourth object of the present invention to provide a method of preventing unjust use of a personal communication terminal which is capable of preventing the use of an unjust terminal by a simple operation when the existence of the unjust terminal is recognized.

To achieve the first and second objects, in a first aspect of the present invention, there is provided a method of preventing unjust use of a personal communication terminal in a communication system which is composed of portable personal communication terminals, a base station for transmitting and receiving a radio signal to and from each of the personal communication terminals and an exchange connected to the base station, the method comprising the steps of: providing each of the personal communication terminals with a storage means for storing communication control information for controlling communication state of the personal communication terminal; providing the exchange with a storage means for updating the communication control information of each of the personal communication terminals and storing the updated information; transmitting the communication control information together with identification data from a corresponding personal communication terminals to the exchange through the base station at the time of communication; comparing the communication control information received with the communication control information stored in correspondence with the personal communication terminal by the exchange; and permitting communication when the communication control information received by the exchange agrees with the communication control information stored in the exchange, while inhibiting communication when they do not agree.

To achieve the third object, in a second aspect of the present invention, there is provided a method of preventing the unjust use of a personal communication terminal, further comprising the steps of: judging, by the exchange, whether or not a password is right which is transmitted from a personal communication terminal together with a request for confirmation of the communication control information; and transmitting the communication control information stored in the storage means of the exchange to the personal communication terminal through the base station when the password is right. According to this structure, the real user of a contracted terminal receives the communication control information held by the exchange, so that the real user can easily recognize the existence of an unjust terminal when the communication control information (e.g., number of times of calling) of the personal communication terminal does not agree with the communication control information (e.g., number of times of calling) held by the exchange.

To achieve the fourth object, in a third aspect of the present invention, there is provided a method of preventing the unjust use of a personal communication terminal, further comprising the steps of: judging, by the exchange, whether or not a password is right which is transmitted from a personal communication terminal together with a request for replacement of the communication control information; and replacing, by the exchange, the communication control information stored in the storage means of the exchange with the communication control information included in the request when the password is right.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Schematic explanation of the invention FIGS. 1 to 3 are schematic explanatory views of the present invention.

Figure 2:
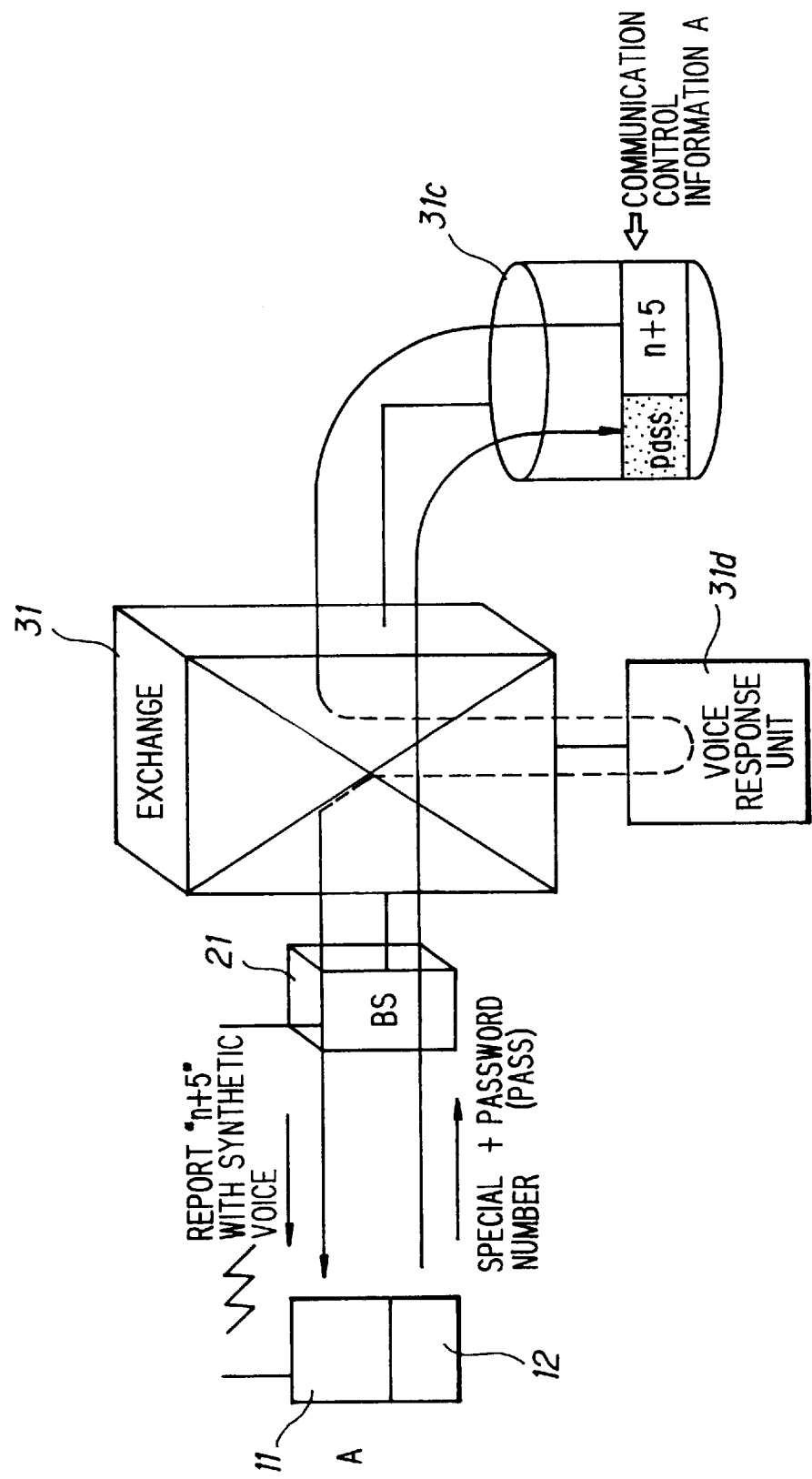
FIG. 2 is a second schematic explanatory view of the present invention.

In each drawing, the reference numeral 11 represents a personal communication terminal of a real contractor which may be refereed to as a contracted terminal or a contracted personal communication terminal, and 11' an unjust personal communication terminal into which the contents of the ROM of the contracted personal communication terminal are copied, each being provided with a memory 12, 12' for storing communication control information such as the number of times of calling. The reference numeral 21 denotes a base station for transmitting and receiving a radio signal to and from a personal communication terminal, 31 an exchange which is connected to the base station 21, 31c a storage means for storing communication control information such as the number of times of calling in correspondence with a personal communication terminal (terminal ID), and 31d (FIG. 2) a voice response unit for responding to an inquiry about communication control information (e.g., number of times of calling) with a synthetic voice.

Figure 1:
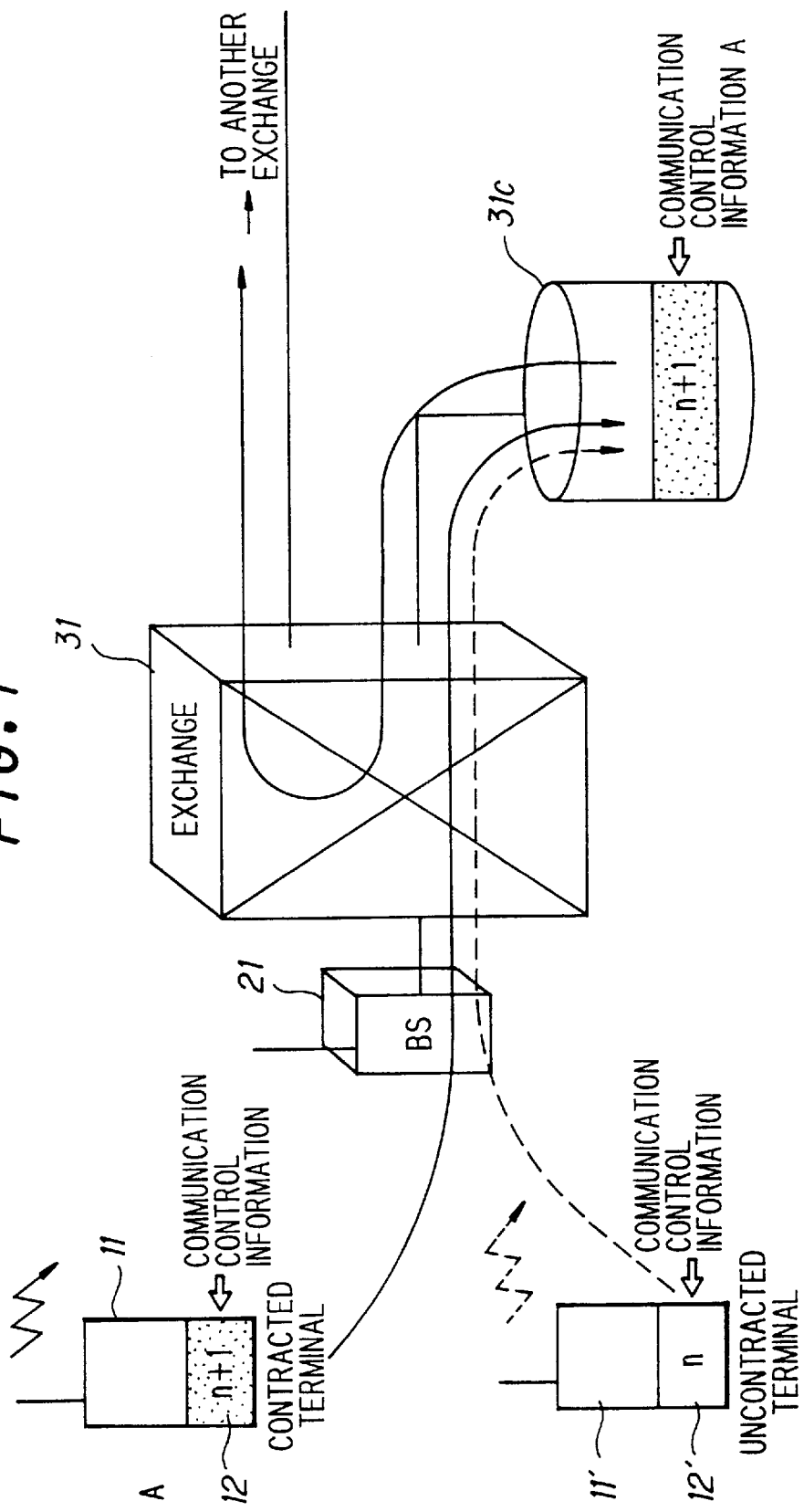
FIG. 1 is a first schematic explanatory view of the present invention.

The personal communication terminal 11 (see FIG. 1) is provided with the memory 12 for counting the number of times of calling, the number of received calls, the number of times of position registration, etc. as communication control information and holding the communication control information, and the exchange 31 is provided with the storage means 31c for storing communication control information in correspondence with each personal communication terminal. The personal communication terminal 11 transmits communication control information (let it be the number of times of calling, for convenience, sake) together with identification data of the personal communication terminal 11 to the exchange 31 through the base station $2_1$ at the time of communication such as calling, and the exchange 31 compares the communication control information (number of times of calling) received with the communication control information (number of times of calling) stored in the storage means 31c in correspondence with the personal communication terminal 11 which has called, and receives the call if the former agrees with the latter, while rejecting the reception of the call if they do not agree. According to this structure, since the communication control information (the number (n+1) of times of calling) of the contracted terminal 11 agrees with the communication control information (the number (n+1) of times of calling) held by the exchange 31, the contracted personal communication terminal 11 can securely communicate with a called party. However, if the unjust terminal 11' calls, since the communication control information (the number n of times of calling) of the unjust terminal 11' does not agree with the communication control information (the number (n+1) of times of calling) held by the exchange 31, the exchange 31 rejects the reception of the call, so that the unjust terminal 11' cannot communicate with a called party. In this manner, it is possible to effectively prevent use of an unjust personal communication terminal. Especially, even if the contents of the ROM of a personal communication terminal of a real contractor are copied into an unjust terminal, it is possible to prevent the unjust terminal from being used. In addition, since the exchange 31 is provided with a function of comparison, it is possible to simplify the structure of the personal communication terminal 11. Since the exchange 31 has only to judge whether the use is unjust or not when there is a request for calling, it is possible to lessen the load of the exchange 31.

The exchange 31 adds 1 to the number of times of calling of the personal communication terminal 11 which has called and holds the updated number of times when the number of times of calling of the personal communication terminal 11 agrees with the number of times of calling held by the exchange 31, and the personal communication terminal 11 adds 1 to the number of times of calling and holds the updated number of times when the call is received. In this manner, it is possible to make the numbers of times of calling held by the contracted terminal 11 and the exchange 31 coincident with each other.

The personal communication terminal 11 reports the end of update of the number of times of calling to the exchange 31, and the exchange 31 continues a call setting process when the end of update is reported. On the other hand, when the exchange 31 does not receive the report of the end of update, the exchange 31 restores the number of times of calling of the personal communication terminal 11 to the original value. In this manner, it is possible to securely make the numbers of times of calling held by the contracted terminal 11 and the exchange 31 coincident with each other even if the number of times of calling is not updated by any reason by the contracted terminal 11 after the call is received.

When the communication control information of the personal communication terminal 11 is not coincident with the communication control information held by the exchange 31, the exchange 31 outputs the fact to a maintenance panel so as to report the existence of an unjust terminal to a maintenance man. In this manner, it is possible to swiftly cope with the use of the unjust terminal.

There is a case in which the number of times of calling of the unjust terminal 11' agrees with the number of times of calling held by the exchange 31 when there is a call from the unjust terminal 11' into which the contents of the ROM of the contracted personal communication terminal 11 are copied. It is, for example, when the unjust terminal 11' calls immediately after copying the contents of the ROM. If the numbers of times of calling agree, communication from the unjust terminal 11' is possible and the number of times of calling is updated. In such case, the number of times of calling of the contracted terminal 11 does not agree with the number of times of calling held by the exchange 31, so that it is thereafter impossible to call from the contracted terminal 11. In this case, in order to clear up the cause, the user requests the exchange 31 to notify of the communication control information (e.g., number of times of calling) by transmitting a special number for the request together with a password from the contracted terminal 11 to the exchange 31 (see FIG. 2). The exchange 31 judges whether or not the password is right, and when the answer is in the affirmative, the exchange 31 transmits the communication control information (number (n+5) of times of calling) stored in the storage means 31c from the voice response unit 31d to the contracted terminal 11 through the base station 21 with a synthetic voice. The user of the contracted terminal 11 then recognizes the disagreement of the communication control information (number of times of calling) of the contracted terminal 11 with the communication control information (number of times of calling) held by the exchange 31, and easily knows the existence of an unjust terminal, thereby coping with the unjust terminal.

Figure 3:
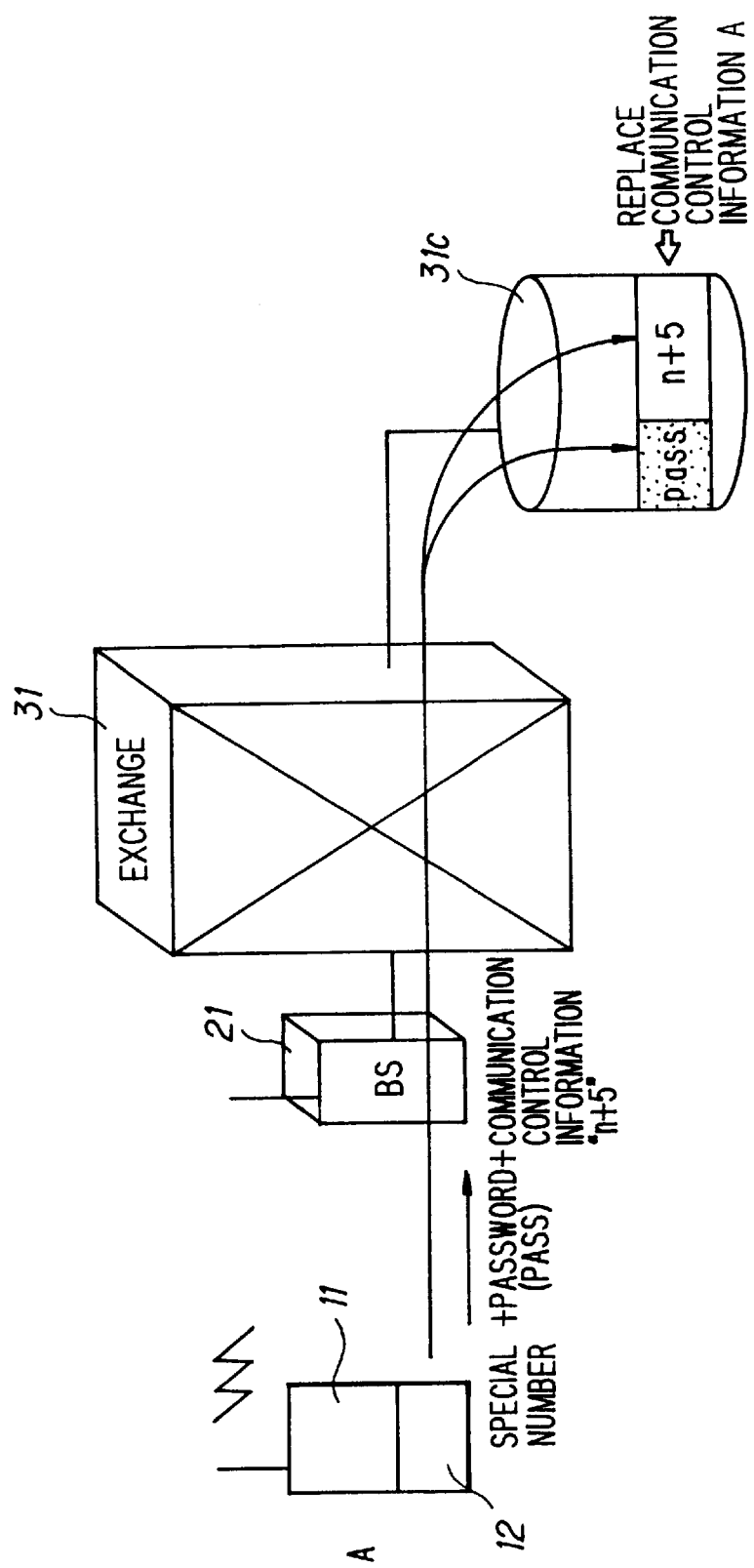
FIG. 3 shows a third schematic explanatory view of the present invention.

When the user of the contracted terminal 11 recognizes the disagreement of the communication control information (number of times of calling) of the contracted terminal 11 with the communication control information (number of times of calling) held by the exchange 3, the user requests the exchange 31 to update the communication control information (number of times of calling) by transmitting a special number for the request together with a password from the contracted terminal 11 to the exchange 31 (see FIG. 3). The exchange 31 judges whether or not the password is right, and when the answer is in the affirmative, the exchange 31 replaces the contracted terminal stored in the storage means 31c with the communication control information (number of times of calling held by the contracted terminal 11) included in the request. In this manner, the numbers of times of calling held by the contracted terminal 11 and the exchange 31 agree with each other thereafter, which enables communication by the contracted terminal 11. On the other hand, the numbers of times of calling held by the unjust terminal 11' and the exchange 31 disagree, so that communication by the unjust terminal 11' is impossible. It is thus possible to prevent use of the unjust terminal 11'.

(B) Embodiment of the invention (a) Personal handy phone system

Figure 4:
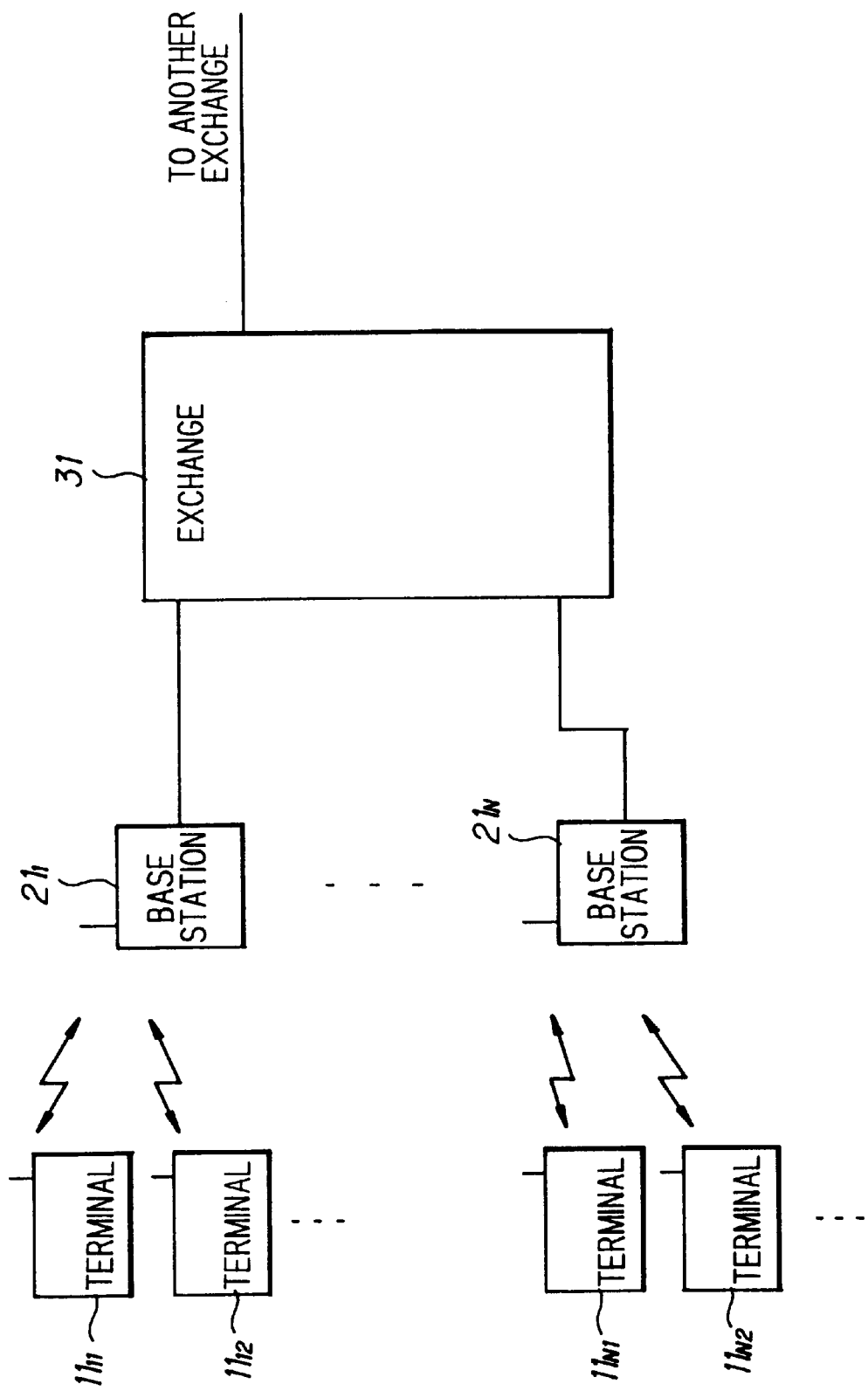
FIG. 4 shows the structure of a personal handy phone system.

FIG. 4 shows the structure of a personal handy phone system according to the present invention. The reference numerals $11_{11}$, $11_{12}$ . . . , $11_{N1}$, $11_{N2}$ . . . represent portable cordless personal communication terminals, $21_1$ to $21_N$ base stations provided in public phone boxes or the like so as to transmit and receive radio signals to and from the personal communication terminals, and 31 an exchange which is connected to the base stations.

Each of the personal communication terminals $11_{11}$, $11_{12}$ . . . , $11_{N1}$, $11_{N2}$ . . . constantly compares the positional information which is transmitted from the corresponding base station $21_1$ to $21_N$ with the positional information which it holds, and if it is not the same, the corresponding personal communication terminal stores the newly received positional information in a memory provided therein and transmits the terminal ID to the exchange 31 through the base station. If the terminal which requests the position to be registered is a contracted terminal, the exchange 31 stores ID of the base station to which the terminal belongs in correspondence with the terminal ID (position registering process).

At the time of calling, if the user of the personal communication terminal $11_{11}$ inputs the telephone number of a called party, the base station $21_1$ designates the communication channel and connects the personal communication terminal $11_{11}$ with the exchange 31. Thereafter, the exchange 31 executes the call setting process between the personal communication terminal $11_{11}$ and the exchange 31, and connects the personal communication terminal $11_{11}$ with the terminal of the called party.

When the exchange 31 receives the number of the called party, the exchange 31 obtains the base station to which the terminal of the called party belongs on the basis of the received number and the registered positional information, and informs the base station of the reception. The base station calls the terminal of the called party, designates the communication channel, and connects the exchange 31 with the terminal of the called party. Thereafter, the exchange 31 executes a call setting process on the terminal of the called party, and when the terminal is a contracted terminal, the exchange 31 connects the terminal of the caller party to the terminal of the called party.

(b) Personal communication terminal

Figure 5:
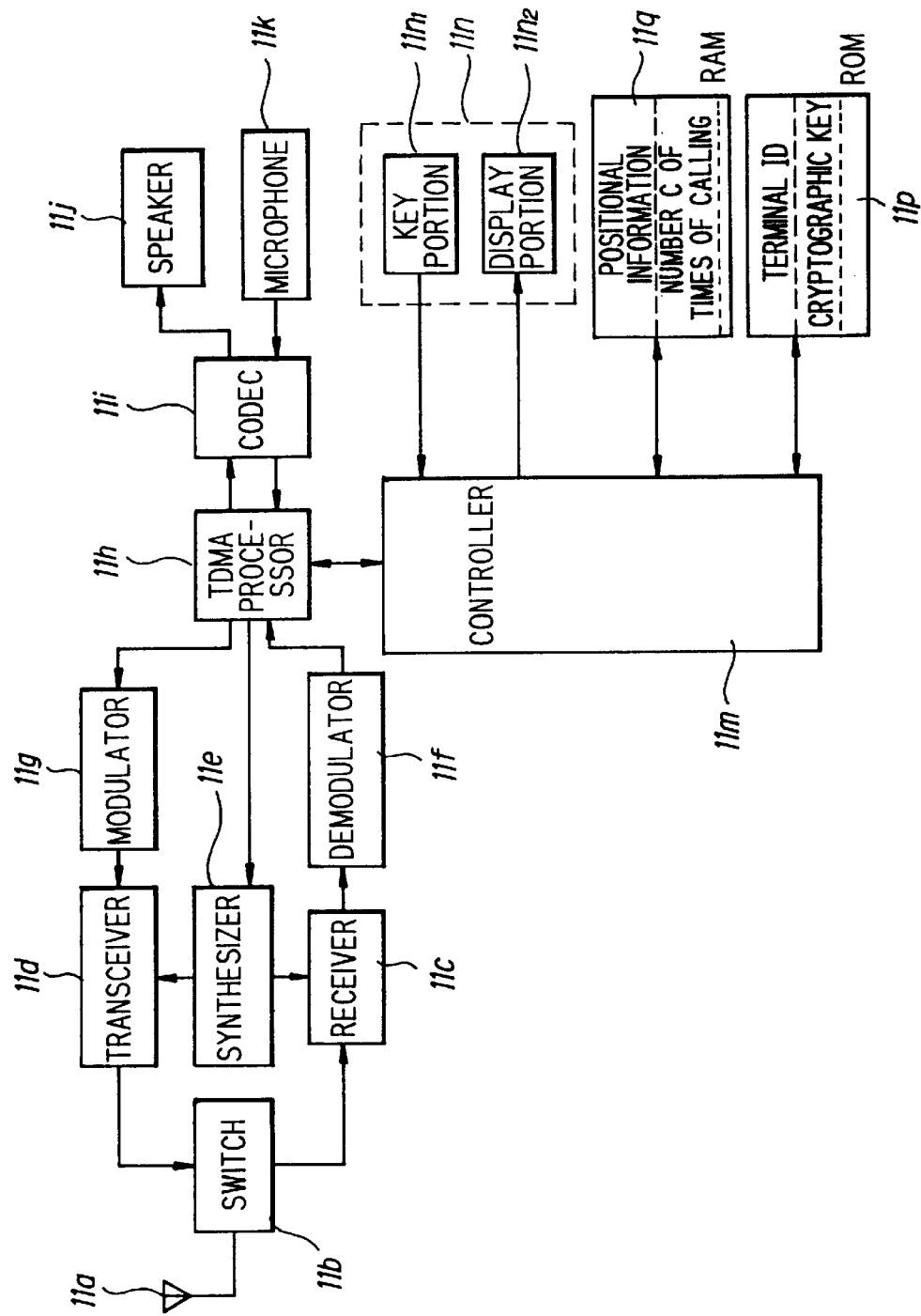
FIG. 5 shows the structure of a personal communication terminal.

FIG. 5 shows the structure of a personal communication terminal. The reference numeral 11a represents an antenna, 11b a switch (duplexer) for appropriately connecting the antenna 11a to a transceiver 11d or a receiver 11c by switching, 11c the receiver, 11d the transceiver, 11e a synthesizer for outputting a predetermined frequency signal in correspondence with a control channel or a communication channel, 11f a demodulator for demodulating digital data, 11g a modulator for modulating digital data, and 11h a TDMA processor for extracting data from a predetermined time slot and outputting the extracted data at the time of reception of data such as control data and PCM voice data, and inserting the data into a predetermined time slot and transmitting the data at the time of transmission of data. The reference numeral 11i represents a CODEC (coder/decoder) for converting received PCM voice data into an analog voice signal and vice versa, 11k a microphone, 11j a speaker, 11m a controller for controlling the personal communication terminal as a whole, 11n an operating portion including a key portion $11n_1$ and a display portion $11n_2$. The reference numeral 11p denotes a ROM for storing a terminal ID and a cryptographic key, and 11q a RAM for storing positional information which designates the zone to which a terminal belongs, communication control information (e.g., number c of times of calling), etc.

(c) Exchange

Figure 6:
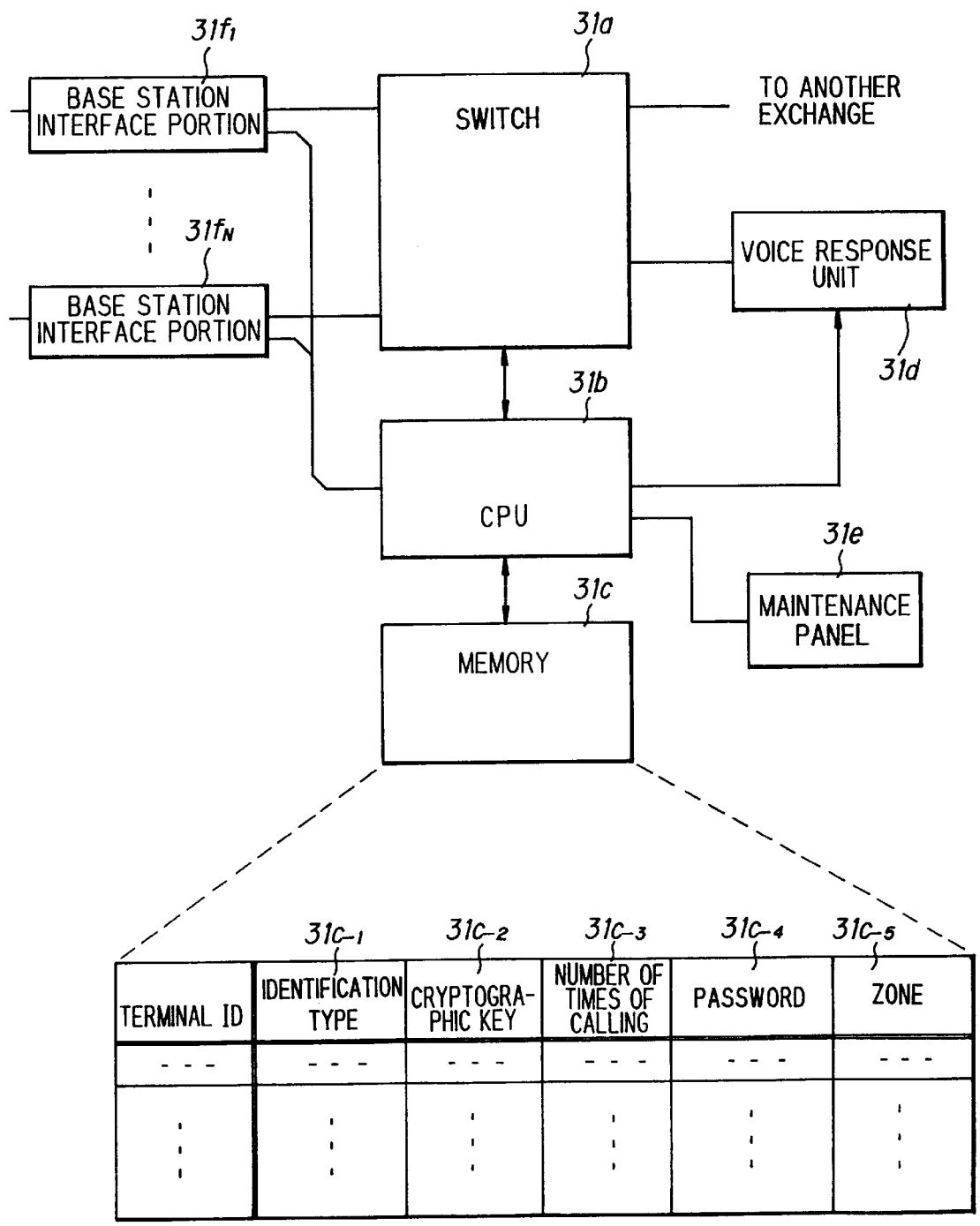
FIG. 6 shows the structure of an exchange.

FIG. 6 shows the structure of an exchange. The reference numeral 31a represents a switch, 31b a processor (CPU) for executing calling processing at the time of calling/receiving, position registering processing, communication control information confirming processing and communication control information replacing processing, etc., 31c a memory for storing various kinds of information such as identification type 31c-1, cryptographic key 31c-2, number of times of calling 31c-3, password 31c-4 and zone 31c-5 in correspondence with the terminal ID, 31d a voice response unit for responding to an inquiry about communication control information (e.g., number of times of calling) from a terminal with a synthetic voice, 31e a maintenance panel, and $31f_1$ to $31f_N$ base station interface portions serving as interfaces of the base stations.

(d) Control process at the time of calling

Figure 7:
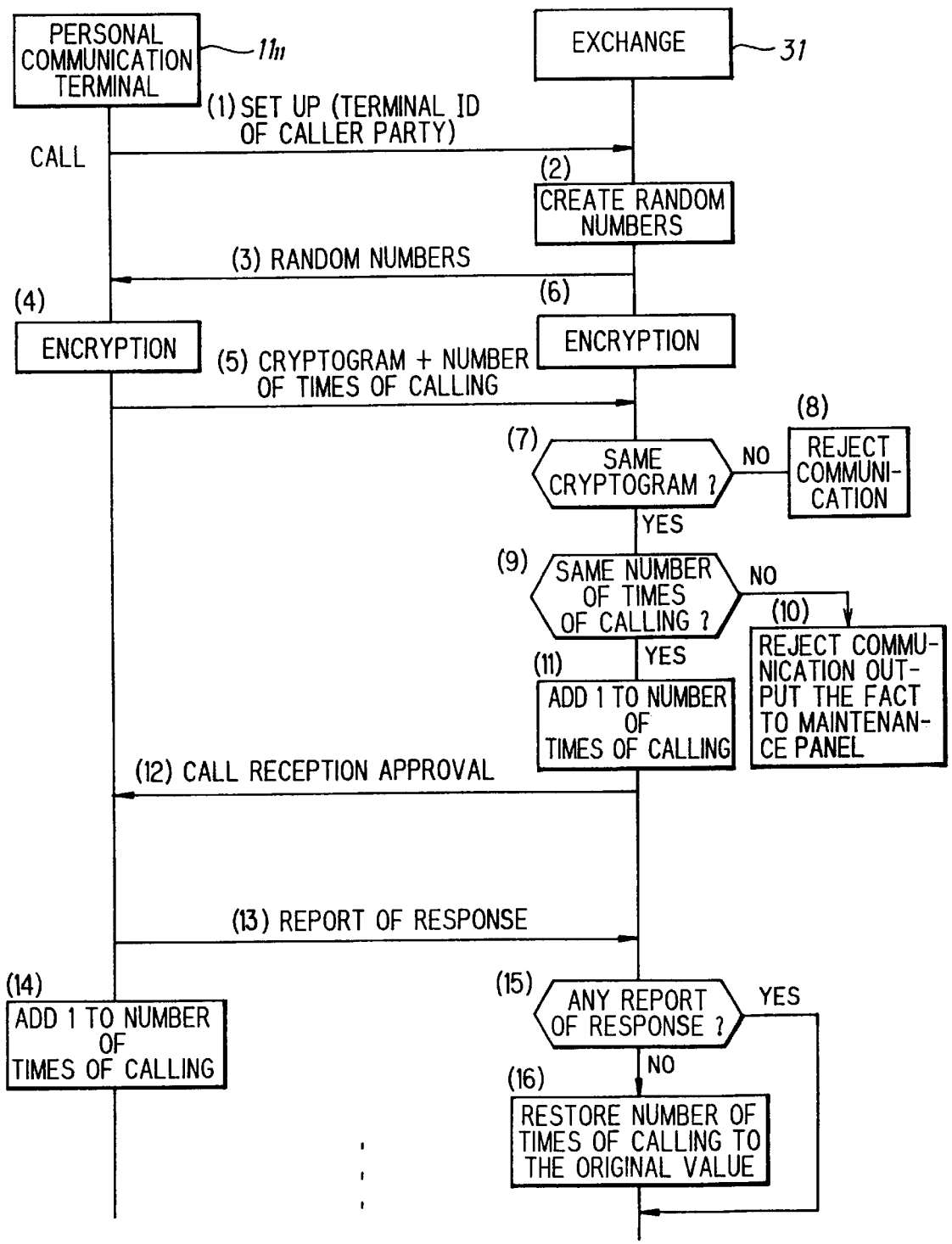
FIG. 7 is an explanatory view of a control process at the time of calling.

FIG. 7 is an explanatory view of a control process at the time of calling.

(1) When the personal communication terminal $11_{11}$ inputs phone number of a called party, the personal communication terminal $11_{11}$ transmits a SET UP message to the exchange 31 through the base station $21_1$. (2) The processor 31b of the exchange 31 obtains, from the memory 31c, the identification type 31c-1 and the cryptographic key 31c-2 corresponding to the calling terminal ID which are included in the SET UP message, and creates random numbers on the basis of the identification type 31c-1 and the cryptographic key 31c-2. (3) The exchange 31 transmits the random numbers to the personal communication terminal $11_{11}$. (4) When the personal communication terminal $11_{11}$ receives the random numbers, the controller 11m enciphers the random numbers by using the cryptographic key stored in the ROM 11p, (5) and transmits the cryptogram to the exchange 31 together with the number c of times of calling. (6) In parallel with this operation, the processor 31b enciphers the random numbers by using the cryptographic key 31c-2, and (7) compares the cryptogram obtained with the cryptogram received from the personal communication terminal $11_{11}$.

(8) If the cryptograms are not coincident, the processor 31b regards the call as a call from unjust terminal and rejects communication, (9) while if the cryptograms are coincident, the processor 31b reads the number of times of calling 31c-3 of the terminal of the caller party from the memory 31c and compares the number of times of calling 31c-3 with the received number c of times of calling. (10) If these numbers of times of calling are not coincident, the processor 31b regards the call as a call from an unjust terminal, rejects communication, reports the fact to the maintenance panel 31e and displays the fact on the display portion. In this manner, the maintenance man can know the existence of an unjust terminal and swiftly cope with the use of the unjust terminal.

(11) On the other hand, when the numbers of times of calling are coincident, the processor 31b regards the call as a call from a contracted terminal, and adds 1 to the number c of times of calling (c+1→c), and (12) transmits call reception approval to the personal communication terminal $11_{11}$. (13) When the personal communication terminal $11_{11}$ receives the call reception approval, the personal communication terminal $11_{11}$ sends a response to the exchange 31, and (14) adds 1 to the number c of times of calling (c+1→c) stored in the RAM 11q. In this manner, it is possible to make the numbers of times of calling held by the contracted terminal $11_{11}$ and the exchange 31 agree with each other.

If there is any accident in the terminal $11_{11}$ or a line is cut, the number of times of calling is not updated. In this case, the personal communication terminal $1_{11}$ does not send the response to the exchange 31.

(15) The processor 31b of the exchange 31 constantly judges whether or not the exchange 31 has received the response, and if the response has been received, the processor 31b continues the call processing and connects the personal communication terminal $11_{11}$ with the terminal of the called party. (16) On the other hand, if no response has reached the exchange 31 after the lapse of a predetermined time, the processor 31b restores the number of times of calling of the personal communication terminal $11_{11}$ to the original value. In this manner, it is possible to securely make the numbers of times of calling held by the contracted terminal $11_{11}$ and the exchange 31 coincident with each other even if the number of times of calling is not updated by any reason by the contracted terminal after the call reception approval is transmitted to the personal communication terminal $11_{11}$.

Figure 8:
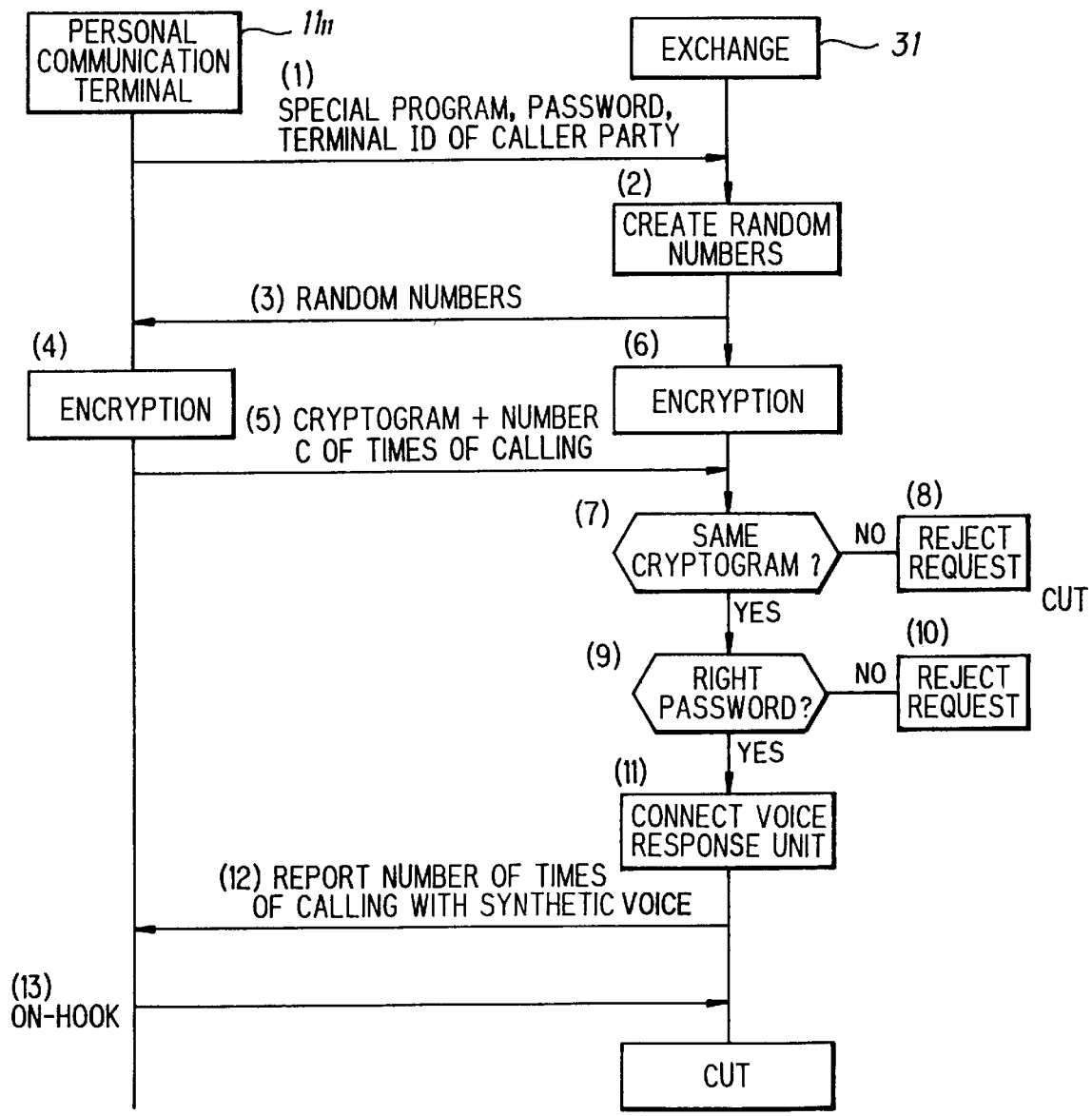
FIG. 8 is an explanatory view of a process when there is a request for confirmation of the number of times of calling.

(e) Process when there is a request for confirmation of the number of times of calling FIG. 8 is an explanatory view of a process when there is a request for confirmation of the number of times of calling.

There is a case in which the number of times of calling of an unjust terminal into which the contents of the ROM of the contracted personal communication terminal $11_{11}$ are copied agrees with the number of times of calling held by the exchange 31. It is, for example, when the contents of both ROM 11p and RAM 11q of the contracted personal communication terminal $11_{11}$ are copied.

If the number of times of calling stored in the unjust terminal agrees with the number of times of calling held by the exchange 31, communication from the unjust terminal is possible and the number of times of calling is updated. In such case, the number of times of calling of the contracted terminal $11_{11}$ does not agree with the number of times of calling held by the exchange 31, so that it is thereafter impossible to call from the contracted terminal $11_{11}$. The user of the contracted terminal $11_{11}$ confirms the communication control information (number of times of calling) held by the exchange 3 in order to clear up the cause.

(1) The user of the contracted terminal $11_{11}$ transmits a special number for confirming the communication control information and a password by operating the operation key $11n_1$ of the personal communication terminal $11_{11}$. The personal communication terminal $11_{11}$ thus transmits a confirmation request message including the special number, password, the terminal ID of the caller party, etc. to the exchange 31 through the base station 21. (2) The processor 31b of the exchange 31 obtains, from the memory 31c, the identification type 31c-1 and the cryptographic key 31c-2 which correspond to the terminal ID of the caller party included in the confirmation request message, creates random numbers on the basis of the identification type 31c-1 and the cryptographic key 31c-2, and (3) transmits the random numbers to the personal communication terminal $11_{11}$. (4) When the controller 11m of the personal communication terminal $11_{11}$ receives the random numbers, the controller 11m enciphers the random numbers by using the cryptographic key stored in the ROM 11p, (5) and transmits the cryptogram to the exchange 31 together with the number c of times of calling. It is not always necessary to supply the number of times of calling. (6) In parallel with this operation, the processor 31b enciphers the random numbers by using the cryptographic key 31c-2, and (7) compares the cryptogram obtained with the cryptogram received from the personal communication terminal $11_{11}$. (8) If the cryptograms are not coincident, the processor 31b regards the request as a request for confirmation from unjust terminal, rejects the request and cuts the line. (9) On the other hand, if the cryptograms are coincident, the processor 31b reads the password 31c-4 of the terminal $11_{11}$ of the caller party from the memory 31c and compares the password 31c-4 with the received password.

(10) If these passwords are not coincident, the processor 31b regards the request for confirmation as a request from an unjust terminal, rejects the request and cuts the line. The processor 31b also reports the fact to the maintenance panel 31e and displays the fact on the display portion. In this manner, the maintenance man can know the existence of an unjust terminal and swiftly cope with the unjust terminal.

(11) On the other hand, when the passwords are coincident, since the request for confirmation is transmitted from the contracted terminal $11_{11}$, the processor 31b reads the number of times of calling of the terminal $11_{11}$ from the memory 31c and inputs it to the voice response unit 31d and starts the voice response unit 31d. The processor 31b so controls the switch 31a as to connect the voice response unit 31d to the base station interface portion $31f_1$ which corresponds to the base station $21_1$ to which the terminal $11_{11}$ belongs. (12) As a result, the voice signal reporting the number of times of calling which is output from the voice response unit 31d is supplied to the terminal $11_{11}$ through the switch 31a, the base station interface portion $31f_1$ and the base station $21_1$. (13) When the user of the contracted terminal $11_{11}$ confirms the number of times of calling held by the exchange 31 from the voice, the user deactivates the terminal $11_{11}$, and the exchange 31 therefore cuts the line.

In this manner, the user of the contracted terminal $11_{11}$ can recognize disagreement of the communication control information (e.g., number of times of calling) of the terminal $11_{11}$ and the communication control information held by the exchange 31, thereby easily knowing the existence of an unjust terminal and coping with the unjust terminal. Herein, the real user can recognize the number of times of calling of the terminal $11_{11}$ by displaying it on the display portion $11n_2$ by the operation of the key.

Figure 9:
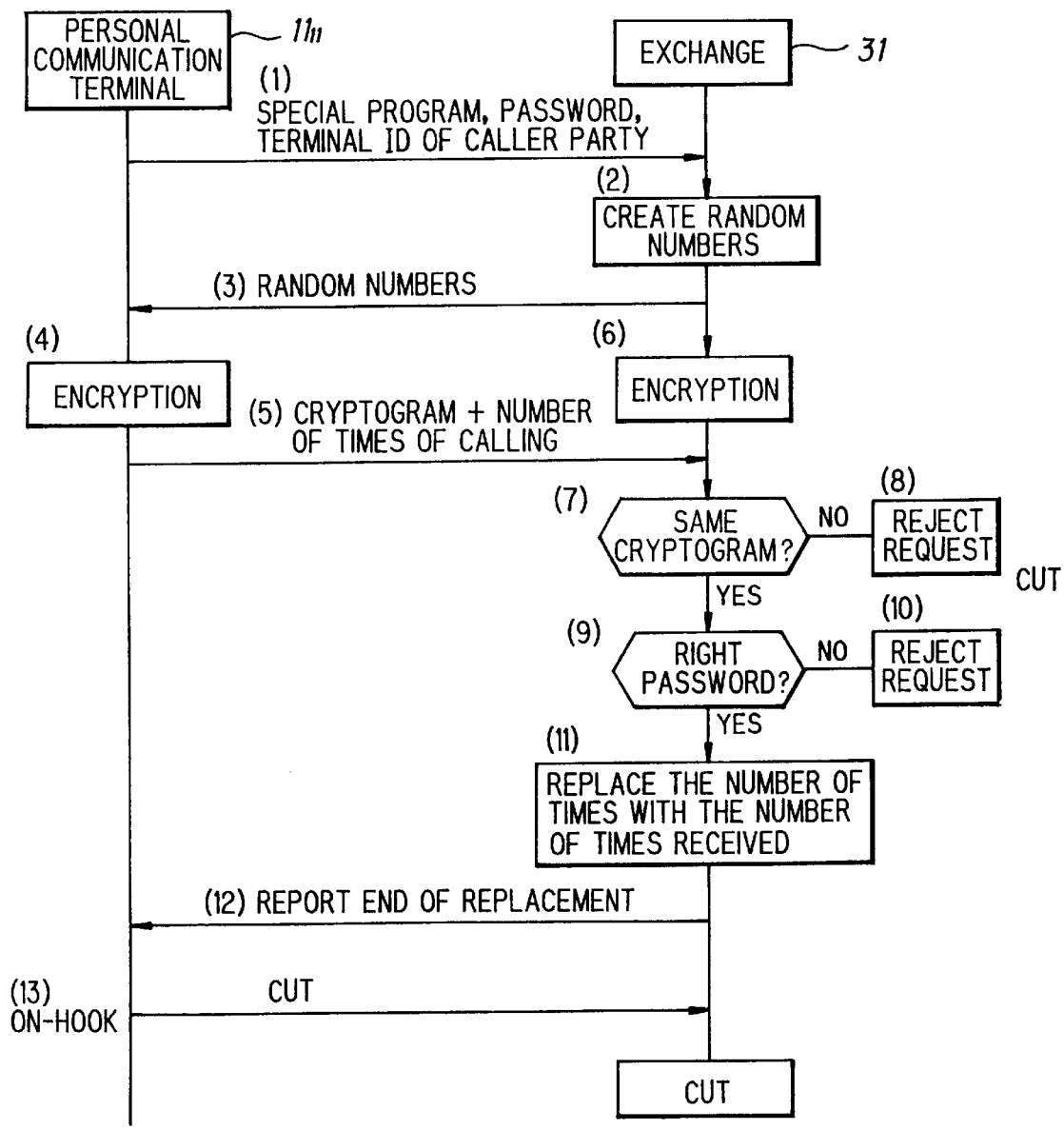
FIG. 9 is an explanatory view of a process when there is a request for replacement of the number of times of calling.
Figure 10:
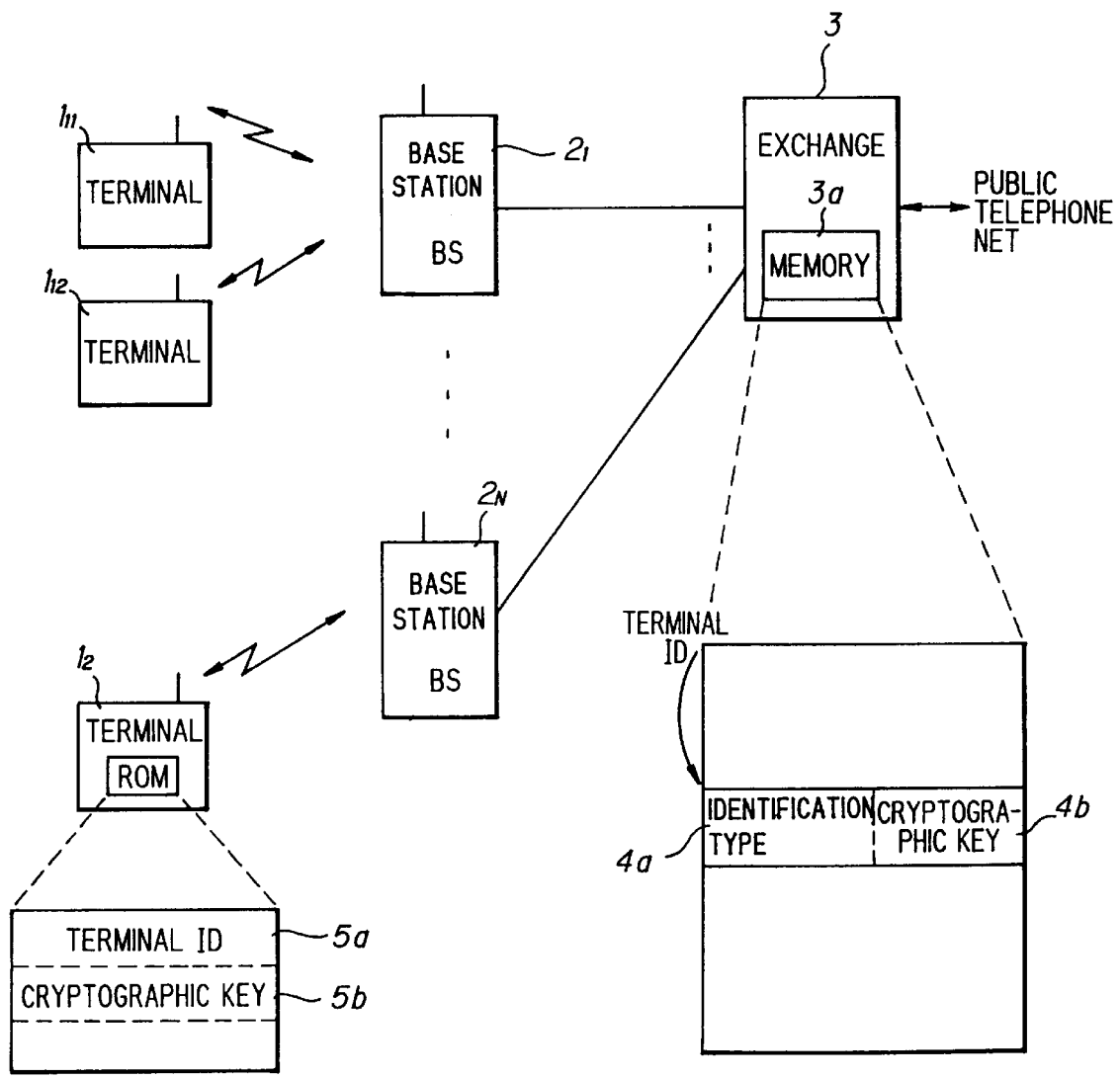
FIG. 10 shows the structure of a conventional personal handy phone system.
Figure 11:
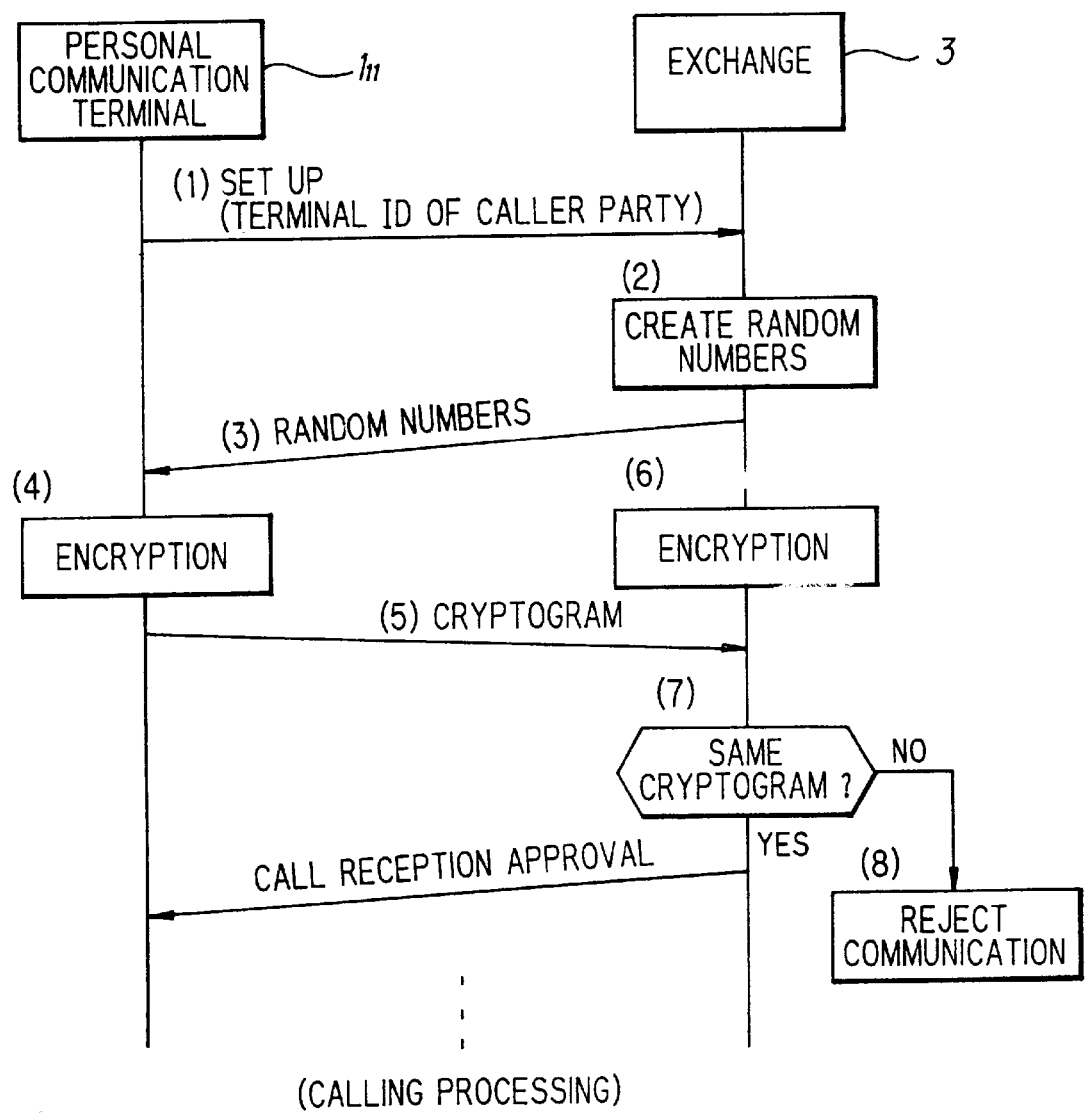
FIG. 11 is an explanatory view of a control process at the time of calling in a conventional system.

(f) Process when there is a request for update of the number of times of calling FIG. 9 is an explanatory view of a process when there is a request for replacement of the number of times of calling.

When the user of the contracted terminal $11_{11}$ recognizes disagreement of the communication control information (e.g., number of times of calling) of the terminal $11_{11}$ and the communication control information held by the exchange 31, it is necessary that the exchange 31 makes them agree by replacing the communication control information held by the exchange 31 with the communication control information of the terminal $11_{11}$.

(1) The user of the contracted terminal $11_{11}$ transmits a special number for replacing the communication control information and a password by operating the operation key $11n_1$ of the personal communication terminal $11_{11}$. The personal communication terminal $11_{11}$ thus transmits an replacement request message including the special number, password, the terminal ID of the caller party, etc. to the exchange 31 through the base station 21. (2) The processor 31b of the exchange 31 obtains, from the memory 31c, the identification type 31c-1 and the cryptographic key 31c-2 which correspond to the terminal ID of the caller party included in the replacement request message, creates random numbers on the basis of the identification 31c-1 and the cryptographic key 31c-2, and (3) transmits the random numbers to the personal communication terminal $11_{11}$. (4) When the controller 11m of the personal communication terminal $11_{11}$ receives the random numbers, the controller 11m enciphers the random numbers by using the cryptographic key stored in the ROM 11p, (5) and transmits the cryptogram to the exchange 31 together with the number c of times of calling.

(6) In parallel with this operation, the processor 31b enciphers the random numbers by using the cryptographic key 31c-2, and (7) compares the cryptogram obtained with the cryptogram received from the personal communication terminal $11_{11}$. (8) If the cryptograms are not coincident, since the request for replacement is supplied from an unjust terminal, the processor 31b rejects the request and cuts the line. (9) On the other hand, if the cryptograms are coincident, the processor 31b reads the password 31c-4 of the terminal $11_{11}$ of the caller party from the memory 31c and compares the password 31c-4 with the received password.

(10) If these passwords are not coincident, the processor 31b regards the request for replacement as a request from an unjust terminal, rejects the request and cuts the line. The processor 31b also reports the fact to the maintenance panel 31e and displays the fact on the display portion. In this manner, the maintenance man can know the existence of an unjust terminal and swiftly cope with the use of the unjust terminal.

(11) On the other hand, when the passwords are coincident, since the request for replacement is transmitted from the contracted terminal $11_{11}$, the processor 31b replaces the number of times of calling 31c-3 which is stored in the memory 31c with the number c of times of calling supplied from the terminal $11_{11}$ at the step (5). (12) The processor 31b reports the end of replacement to the terminal $11_{11}$ through the base station $21_1$. (13) Thereafter, the user of the contracted terminal $11_{11}$ deactivates the terminal $11_{11}$, and the exchange 31 therefore cuts the line.

In this manner, the number of times of calling of the contracted terminal $11_{11}$ is made coincident with the number of times of calling held by the exchange 31, thereby enabling the contracted terminal $11_{11}$ to communicate. On the other hand, since the number of times of calling of the unjust terminal is different from the number of times of calling held by the exchange 31, the unjust terminal cannot communicate. It is thus possible to prevent the use of the unjust terminal.

(g) Modification

In the above-described embodiment, the number of times of calling is used as the communication control information, but the number of received calls, the number of times of position registration, etc. are also usable as the communication control information. For example, if the number of received calls is used as the communication control information, when there is a request for call from a personal communication terminal, the exchange accepts the request for call if the number of received calls of the personal communication terminal agrees with the number of received calls held by the exchange, while rejecting the request if they do not agree. In the case of using the number of times of position registration, when there is a request for call from a personal communication terminal, the exchange accepts the request for call if the number of times of position registration of the personal communication terminal agrees with the number of times of position registration held by the exchange, while rejecting the request if they do not agree.

Although only calling processing is explained in the above embodiment, it is also possible to compare the communication control information of a terminal with the communication control information held by the exchange in the case of reception processing and position registration processing, so as to receive a call and register a position only when they agree, while rejecting reception or position registration when they disagree.

As described above, according to the present invention, since the exchange executes calling processing at the time of calling/receiving and position registering processing only when the communication control information (e.g., number of times of calling) held by the terminal agrees with the communication control information (number of times of calling) held by the exchange, a contracted terminal is capable of calling, receiving a call and registering a position. On the other hand, since the communication control information (e.g., number of times of calling) held by an unjust terminal does not agree with the communication control information (number of times of calling) held by the exchange, the exchange rejects calling, reception or position registration from the unjust terminal, so that the unjust terminal cannot communicate with the called party. It is thus possible to effectively prevent the use of an unjust personal communication terminal according to the present invention. Especially, it is possible to prevent the use of the unjust terminal into which the contents of the ROM of a contracted terminal are copied. In addition, according to the present invention, since the exchange is provided with a function of comparison, the structure of the personal communication terminal is simplified, and since the exchange has only to judge whether the use is unjust or not when there is a request for calling, it is possible to lessen the load of the exchange.

According to the present invention, since the exchange accepts a request for calling and adds 1 to the number of times of calling of the personal communication terminal which has called and the personal communication terminal adds 1 to the number of times of calling stored in the RAM if the call is accepted by the exchange, it is possible to securely make the numbers of times of calling held by the contracted terminal and the exchange agree with each other. In addition, the personal communication terminal reports the end of update of the number of times of calling to the exchange, and the exchange continues a call setting process when the end of update is reported. On the other hand, when the exchange does not receive the report of the end of update, the exchange restores the number of times of calling of the personal communication terminal to the original value. As a result, it is possible to securely make the numbers of times of calling held by the contracted terminal 11 and the exchange coincident with each other even if the number of times of calling is not updated by any reason (such as disconnection and abnormality) by the contracted terminal after the call is accepted.

When the communication control information of the personal communication terminal is not coincident with the communication control information held by the exchange, the exchange outputs the fact to a maintenance panel so as to report the existence of an unjust terminal to a maintenance man. Accordingly, it is possible to swiftly cope with the use of the unjust terminal.

According to the present invention, since it is possible to confirm the communication control information held by the exchange by transmitting a request for confirmation of the communication control information from a contacted terminal to the exchange, the user of the contracted terminal can easily recognize the disagreement of the communication control information (e.g., number of times of calling) of the contracted terminal with the communication control information (number of times of calling) held by the exchange, and know the existence of an unjust terminal, thereby coping with the unjust terminal.

Furthermore, according to the present invention, even when the communication control information (number of times of calling) of the contracted terminal disagrees with the communication control information (number of times of calling) held by the exchange, if a request for replacement is transmitted from the contracted terminal to the exchange, the exchange replaces the communication control information with the communication control information of the contracted terminal. The numbers of times of calling held by the contracted terminal and the exchange therefore agree with each other thereafter, which enables communication by the contracted terminal. On the other hand, the numbers of times of calling held by the unjust terminal and the exchange disagree, so that communication by the unjust terminal is impossible. It is thus possible to prevent use of the unjust terminal.

As many apparently widely different embodiments of the present invention can be made without departing from the spirit and scope thereof, it is to be understood that the invention is not limited to the specific embodiment thereof except as defined in the appended claims.

What is claimed is:

1. A method of preventing unjust use of a personal communication terminal in a communication system having portable personal communication terminals, a base station for transmitting and receiving a radio signal to and from each of said personal communication terminals and an exchange connected to said base station, said method comprising the steps of:

providing each of said personal communication terminals with a storage means for storing communication control information for controlling communication state of said personal communication terminal;

providing said exchange with a storage means for updating the communication control information of each personal communication terminal and storing the updated information;

transmitting said communication control information together with identification data from said personal communication terminal to said exchange through said base station at the time of communication;

comparing said communication control information received with said communication control information stored in correspondence with said personal communication terminal, by said exchange; and permitting communication when said communication control information received agrees with said communication control information stored in said exchange, while inhibiting communication when the former does not agree with the latter.

2. A method of preventing unjust use of a personal communication terminal according to claim 1, wherein said communication control information is number of times of calling; and said exchange accepts a request for call from said personal communication terminal if the number of times of calling of said personal communication terminal agree with the number of times of calling held by said exchange, while rejecting said request if the numbers of times of calling do not agree.

3. A method of preventing unjust use of a personal communication terminal according to claim 2, wherein said exchange adds 1 to the number of times of calling of said personal communication terminal and stores the updated number of times when said numbers of times of calling agree with each other; and said personal communication terminal adds 1 to the number of times of calling and stores the updated number of times when said request for call is accepted.

4. A method of preventing unjust use of a personal communication terminal according to claim 3, wherein said personal communication terminal reports the end of update of said number of times of calling to said exchange; and said exchange continues a call setting process when the end of update is reported, while restoring said number of times of calling of said personal communication terminal to the original value when said exchange does not receive the report of the end of update.

5. A method of preventing unjust use of a personal communication terminal according to claim 1, wherein, when said communication control information of said personal communication terminal is not coincident with said communication control information held by said exchange, said exchange outputs the fact to a maintenance panel.

6. A method of preventing unjust use of a personal communication terminal according to claim 1, further comprising the steps of:

judging, by said exchange, whether or not a password is right which is transmitted from said personal communication terminal together with a request for confirmation of said communication control information; and transmitting said communication control information stored in said storage means of said exchange to said personal communication terminal through said base station when said password is right.

7. A method of preventing unjust use of a personal communication terminal according to claim 1, further comprising the steps of:

judging, by said exchange, whether or not a password is right which is transmitted from said personal communication terminal together with a request for replacement of said communication control information; and replacing, by said exchange, said communication control information stored in said storage means of said exchange with said communication control information included in said request for replacement.

8. A method of preventing unjust use of a personal communication terminal according to claim 1, wherein said communication control information is number of received calls; and said exchange accepts a request for call from said personal communication terminal if the number of received calls of said personal communication terminal agree with the number of received calls held by said exchange, while rejecting said request if the numbers of received calls do not agree.

9. A method of preventing unjust use of a personal communication terminal according to claim 1, wherein said communication control information is number of times of position registration; and said exchange accepts a request for call from said personal communication terminal if the number of times of position registration of said personal communication terminal agrees with the number of times of position registration held by said exchange, while rejecting said request if the numbers of times of position registration do not agree.

10. A communication system for preventing unjust use of a personal communication terminal comprising:

portable personal communication terminals;

a base station for transmitting and receiving a radio signal to and from each of said personal communication terminals; and an exchange connected to said base station, each of said personal communication terminals including:

storage means for storing communication control information for controlling a communication state of said personal communication terminal; and means for transmitting said communication control information together with identification data to said exchange through said base station at the time of communication, said exchange including:

storage means for updating the communication control information of each personal communication terminal and storing the updated information;

means for comparing communication control information received from the personal communication terminal with said communication control information stored in correspondence with said personal communication terminal; and means for permitting and inhibiting communication, which means permits communication when said communication control information received agrees with said communication control information stored in said storage means, and inhibits communication when the communication control information received does not agree with the stored communication control information.

11. A communication system for preventing unjust use of a personal communication terminal according to claim 10, wherein said communication control information is a number of times of calling; and said exchange accepts a request for call from said personal communication terminal if the number of times of calling of said personal communication terminal agrees with the number of times of calling held by said exchange, while rejecting said request if the numbers of times of calling do not agree.

12. A communication system for preventing unjust use of a personal communication terminal according to claim 11, wherein said storage means of the exchange adds 1 to the number of times of calling of said personal communication terminal and stores the updated number of times when said numbers of times of calling agree with each other; and said storage means of the personal communication terminal adds 1 to the number of times of calling and stores the updated number of times when said request for call is accepted.

13. A communication system for preventing unjust use of a personal communication terminal according to claim 10, said communication system further comprising:

a maintenance panel, wherein, when said communication control information of said personal communication terminal is not coincident with said communication control information held by said exchange, said exchange outputs the non-coincidence to said maintenance panel.

14. A communication system for preventing unjust use of a personal communication terminal according to claim 10, said exchange further including:

means for judging whether or not a password is right which is transmitted from said personal communication terminal together with a request for confirmation of said communication control information; and means for transmitting said communication control information stored in said storage means of said exchange to said personal communication terminal through said base station when said password is right.

15. A communication system for preventing unjust use of a personal communication terminal according to claim 10, said exchange further including:

means for judging whether or not a password is right which is transmitted from said personal communication terminal together with a request for replacement of said communication control information; and means for replacing said communication control information stored in said storage means of said exchange with said communication control information included in said request for replacement.

16. A communication system for preventing unjust use of a personal communication terminal according to claim 10, wherein said communication control information is number of received calls; and said exchange accepts a request for call from said personal communication terminal if the number of received calls of said personal communication terminal agree with the number of received calls held by said exchange, while rejecting said request if the numbers of received calls do not agree.

17. A communication system for preventing unjust use of a personal communication terminal according to claim 10, wherein said communication control information is a number of times of position registration; and said exchange accepts a request for call from said personal communication terminal if the number of times of position registration of said personal communication terminal agree with the number of times of position registration held by said exchange, while rejecting said request if the numbers of times of position registration do not agree.

18. An exchange for preventing unjust use of a personal communication terminal in a communication system having portable personal communication terminals, a base station for transmitting and receiving a radio signal to and from each of said personal communication terminals and an exchange connected to said base station, said exchange comprising:

storage means for updating communication control information of each personal communication terminal and storing the updated information;

means for comparing communication control information received from each personal communication terminal with said communication control information stored in correspondence with said personal communication terminal; and means for permitting and inhibiting communication, which means permits communication when said communication control information received agrees with said communication control information stored in said storage means, and inhibits communication when the communication control information does not agree with the stored communication control information, wherein each of said personal communication terminals stores communication control information for controlling a communication state of said personal communication terminal and transmits said communication control information together with identification data to the exchange through said base station at the time of communication, and wherein said communication control information is a number of times of calling; and said exchange accepts a request for call from said personal communication terminal if the number of times of calling of said personal communication terminal agrees with the number of times of calling held by said storage means, while rejecting said request if the numbers of times of calling do not agree.

19. An exchange for preventing unjust use of a personal communication terminal according to claim 18, wherein said storage means adds 1 to the number of times of calling of said personal communication terminal and stores the updated number of times when said numbers of times of calling agree with each other; and said personal communication terminal adds 1 to the number of times of calling and stores the updated number of times when said request for call is accepted.

20. An exchange for preventing unjust use of a personal communication terminal in a communication system having portable personal communication terminals, a base station for transmitting and receiving a radio signal to and from each of said personal communication terminals and an exchange connected to said base station, said exchange comprising:

storage means for updating communication control information of each personal communication terminal and storing the updated information;

means for comparing communication control information received from each personal communication terminal with said communication control information stored in correspondence with said personal communication terminal; and means for permitting and inhibiting communication, which means permits communication when said communication control information received agrees with said communication control information stored in said storage means, and inhibits communication when the communication control information does not agree with the stored communication control information, wherein each of said personal communication terminals stores communication control information for controlling a communication state of said personal communication terminal and transmits said communication control information together with identification data to the exchange through said base station at the time of communication, and wherein, when said communication control information of said personal communication terminal is not coincident with said communication control information held by said exchange, said exchange outputs the non-coincidence to a maintenance panel.

21. An exchange for preventing unjust use of a personal communication terminal in a communication system having portable personal communication terminals, a base station for transmitting and receiving a radio signal to and from each of said personal communication terminals and an exchange connected to said base station, said exchange comprising:

storage means for updating communication control information of each personal communication terminal and storing the updated information;

means for comparing communication control information received from each personal communication terminal with said communication control information stored in correspondence with said personal communication terminal; and means for permitting and inhibiting communication, which means permits communication when said communication control information received agrees with said communication control information stored in said storage means, and inhibits communication when the communication control information does not agree with the stored communication control information, wherein each of said personal communication terminals stores communication control information for controlling a communication state of said personal communication terminal and transmits said communication control information together with identification data to the exchange through said base station at the time of communication, and means for judging whether or not a password is right which is transmitted from said personal communication terminal together with a request for confirmation of said communication control information; and means for transmitting said communication control information stored in said storage means to said personal communication terminal through said base station when said password is right.

22. An exchange for preventing unjust use of a personal communication terminal in a communication system having portable personal communication terminals, a base station for transmitting and receiving a radio signal to and from each of said personal communication terminals and an exchange connected to said base station, said exchange comprising:

storage means for updating communication control information of each personal communication terminal and storing the updated information;

means for comparing communication control information received from each personal communication terminal with said communication control information stored in correspondence with said personal communication terminal; and means for permitting and inhibiting communication, which means permits communication when said communication control information received agrees with said communication control information stored in said storage means, and inhibits communication when the communication control information does not agree with the stored communication control information, wherein each of said personal communication terminals stores communication control information for controlling a communication state of said personal communication terminal and transmits said communication control information together with identification data to the exchange through said base station at the time of communication, and means for judging whether or not a password is right which is transmitted from said personal communication terminal together with a request for replacement of said communication control information; and means for replacing said communication control information stored in said storage means with said communication control information included in said request for replacement.

23. An exchange for preventing unjust use of a personal communication terminal in a communication system having portable personal communication terminals, a base station for transmitting and receiving a radio signal to and from each of said personal communication terminals and an exchange connected to said base station, said exchange comprising:

storage means for updating communication control information of each personal communication terminal and storing the updated information;

means for comparing communication control information received from each personal communication terminal with said communication control information stored in correspondence with said personal communication terminal; and means for permitting and inhibiting communication, which means permits communication when said communication control information received agrees with said communication control information stored in said storage means, and inhibits communication when the communication control information does not agree with the stored communication control information, wherein each of said personal communication terminals stores communication control information for controlling a communication state of said personal communication terminal and transmits said communication control information together with identification data to the exchange through said base station at the time of communication, and wherein said communication control information is a number of received calls; and said exchange accepts a request for call from said personal communication terminal if the number of received calls of said personal communication terminal agrees with the number of received calls held by said storage means, while rejecting said request if the numbers of received calls do not agree.

24. An exchange for preventing unjust use of a personal communication terminal in a communication system having portable personal communication terminals, a base station for transmitting and receiving a radio signal to and from each of said personal communication terminals and an exchange connected to said base station, said exchange comprising:

storage means for updating communication control information of each personal communication terminal and storing the updated information;

means for comparing communication control information received from each personal communication terminal with said communication control information stored in correspondence with said personal communication terminal; and means for permitting and inhibiting communication, which means permits communication when said communication control information received agrees with said communication control information stored in said storage means, and inhibits communication when the communication control information does not agree with the stored communication control information, wherein each of said personal communication terminals stores communication control information for controlling a communication state of said personal communication terminal and transmits said communication control information together with identification data to the exchange through said base station at the time of communication, and wherein said communication control information is a number of times of position registration; and said exchange accepts a request for call from said personal communication terminal if the number of times of position registration of said personal communication terminal agree with the number of times of position registration held by said storage means, while rejecting said request if the numbers of times of position registration do not agree.

* * * * *

UNITED STATES PATENT AND TRADEMARK OFFICE
CERTIFICATE OF CORRECTION

Page 1 of 1

PATENT NO. : 5,991,623
DATED : November 23, 1999
INVENTOR(S) : Tadahiro Ohta et al.

It is certified that error appears in the above-identified patent and that said Letters Patent is hereby corrected as shown below:

<u>On the Title Page,</u>
Please insert the following item [73]: Assignee: Fujitsu Limited, Kanagawa, Japan Signed and Sealed this Twenty-fourth Day of July, 2001

*Nicholas P. Godici*

Attest:

*Attesting Officer*

NICHOLAS P. GODICI
*Acting Director of the United States Patent and Trademark Office*